United States Patent
Hehenberger

(10) Patent No.: US 8,206,262 B2
(45) Date of Patent: Jun. 26, 2012

(54) DIFFERENTIAL GEAR ON A WIND POWER PLANT AND METHOD FOR CHANGING OR SWITCHING THE POWER RANGE OF SAID DIFFERENTIAL GEAR

(75) Inventor: Gerald Hehenberger, Klagenfurt (AT)

(73) Assignee: AMSC Austria GmbH, Klangenfurt am Wörthersee (AT)

( * ) Notice: Subject to any disclaimer, the term of this patent is extended or adjusted under 35 U.S.C. 154(b) by 0 days.

(21) Appl. No.: 12/515,849

(22) PCT Filed: Nov. 5, 2007

(86) PCT No.: PCT/AT2007/000498
§ 371 (c)(1),
(2), (4) Date: Oct. 15, 2009

(87) PCT Pub. No.: WO2008/061263
PCT Pub. Date: May 29, 2008

(65) Prior Publication Data
US 2010/0048350 A1 Feb. 25, 2010

(30) Foreign Application Priority Data
Nov. 21, 2006 (AT) .................. A 1929/2006

(51) Int. Cl.
| | |
|---|---|
| B60W 10/04 | (2006.01) |
| B60W 10/10 | (2006.01) |
| F16H 47/04 | (2006.01) |
| F16H 35/02 | (2006.01) |
| F16H 35/06 | (2006.01) |
| F16H 35/08 | (2006.01) |
| H02K 7/10 | (2006.01) |
| H02K 7/18 | (2006.01) |
| F02B 63/04 | (2006.01) |
| F03D 9/00 | (2006.01) |
| H02P 9/04 | (2006.01) |

(52) U.S. Cl. ............... 477/37; 475/72; 290/1 C; 290/44; 290/55; 74/393; 74/395

(58) Field of Classification Search ............ 74/381–387, 74/393; 475/72, 76–83, 209, 214, 215, 218; 290/1 C, 44, 52, 54, 55, 43
See application file for complete search history.

(56) References Cited

U.S. PATENT DOCUMENTS
4,613,760 A * 9/1986 Law .............................. 290/1 C
(Continued)

FOREIGN PATENT DOCUMENTS
DE 4321755 12/1993
(Continued)

*Primary Examiner* — Tisha Lewis
(74) *Attorney, Agent, or Firm* — Occhiuti Rohlicek & Tsao LLP

(57) ABSTRACT

A differential gear for a wind power plant includes a gearbox with three inputs and outputs. One input is connected to the rotor of the wind power plant, the first output is connected to a generator and the second output is connected to the input shaft of a continuously variable gearbox, the output shaft of which is connected to the generator side output of the gearbox. The input shaft of the continuously variable gearbox is connected to the output shaft of the gearbox via a variable gearbox.

3 Claims, 1 Drawing Sheet

U.S. PATENT DOCUMENTS

| | | | |
|---|---|---|---|
| 4,774,855 A | 10/1988 | Murrell et al. | |
| 7,560,824 B2 * | 7/2009 | Hehenberger | 290/44 |
| 7,794,348 B2 * | 9/2010 | Tilscher et al. | 475/53 |
| 7,816,798 B2 * | 10/2010 | Hehenberger | 290/44 |
| 2003/0168862 A1 | 9/2003 | Ishizaki | |
| 2010/0102558 A1 * | 4/2010 | Weichbold et al. | 290/44 |
| 2010/0207396 A1 * | 8/2010 | Simon | 290/55 |
| 2010/0244447 A1 * | 9/2010 | Gopalswamy et al. | 290/50 |

FOREIGN PATENT DOCUMENTS

| | | |
|---|---|---|
| DE | 10123105 | 11/2002 |
| DE | 102005012167 | 4/2006 |
| EP | 0120654 | 10/1984 |
| WO | WO81/01444 | 5/1981 |
| WO | WO2004/088132 | 10/2004 |
| WO | WO2004/109157 | 12/2004 |

\* cited by examiner

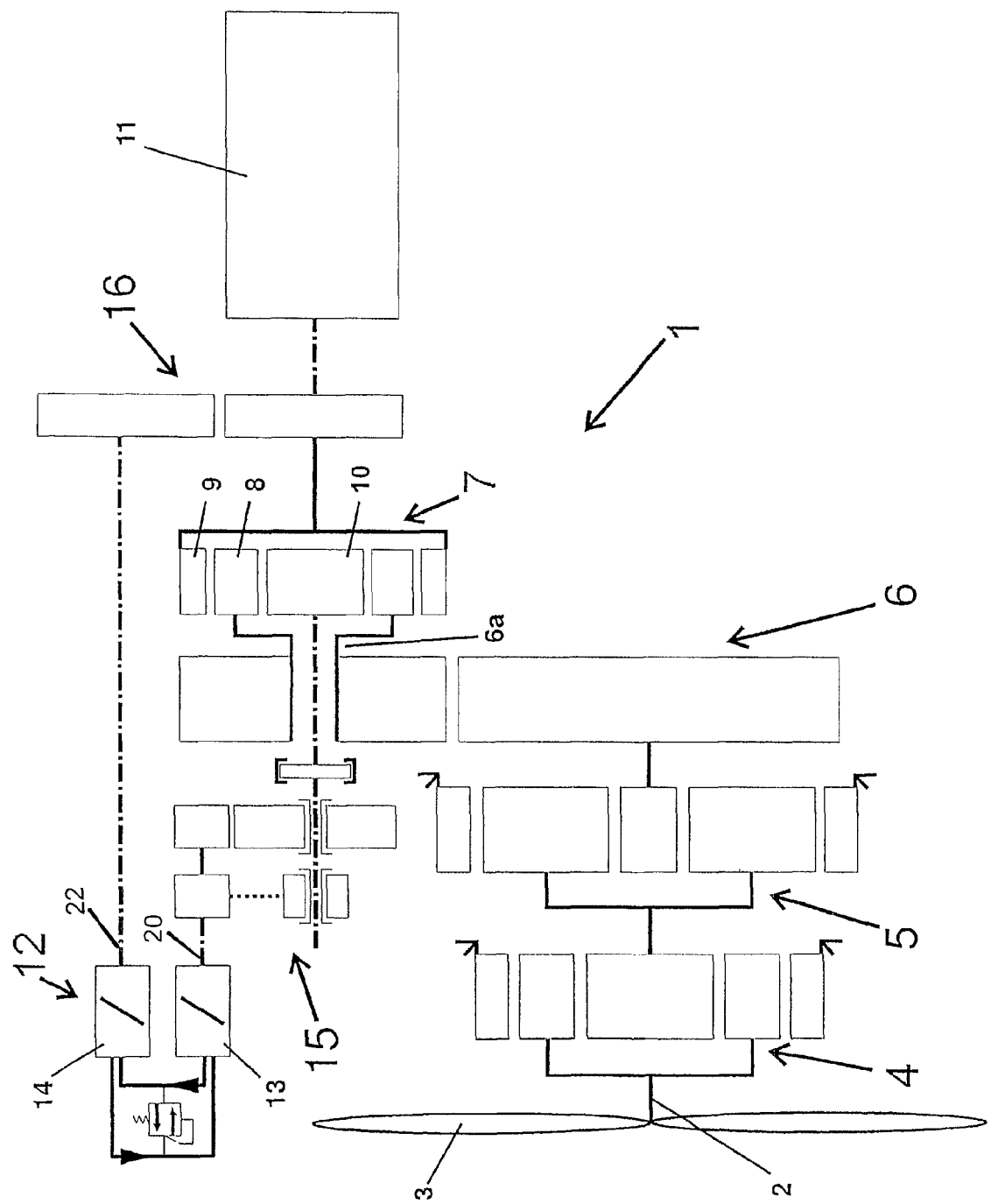

DIFFERENTIAL GEAR ON A WIND POWER PLANT AND METHOD FOR CHANGING OR SWITCHING THE POWER RANGE OF SAID DIFFERENTIAL GEAR

CROSS-REFERENCE TO RELATED APPLICATIONS

This application is the National Stage of International Application No. PCT/AT2007/000498, filed on Nov. 5, 2007, which claims the priority of Austrian Application No. A 1929/2006, filed on Nov. 21, 2006. The contents of both applications are hereby incorporated by reference in their entirety.

BACKGROUND

The invention relates to an equalising gear for a wind energy system comprising a gear unit having three in- or outputs, an input being connected to the rotor of the wind energy system, the first output being connected to a generator and the second output being connected to the input shaft of a continuously controllable gearing, the output shaft of which is connected to the generator-side output of the gear unit.

The invention further relates to a method for changing or switching the power range of an equalising gear of a wind energy system when the wind strength changes comprising a gear unit having three in- or outputs, an input being connected to the rotor of the wind energy system, the first output being connected to a generator and the second output being connected to the input shaft of a continuously controllable gearing.

State of the art wind energy systems generally function at variable rotor speeds and have active torque control of the transmission for regulation purposes. This is because the variable rotational speed of the rotor, on account of the moment of inertia thereof, dampens changes in the rotational speed of the transmission, thus enabling the rotor blade adjustment system to be optimally configured. Furthermore, torque control of the transmission enables the loads on the system to be reduced and the quality of the energy supplied to the grid to be optimised. The improved aerodynamic efficiency in the part-load range is a further advantage of the variable rotor speed.

The variable rotational speed of the generator, and the associated superimposed acceleration torque, generally has a detrimental impact on the gear unit in particular, which must be made stronger as a result. A further drawback is that the inputs with variable rotational speeds that are predominantly used in the prior art generally function using frequency converters, which can only generate power of the required quality by using considerably more expensive technology.

WO 2004/088132 A discloses a device which avoids the aforementioned drawbacks by using an equalising gear and a hydrodynamic torque converter. However, a disadvantage of this solution is the considerable cost of the gear and the hydrodynamic system which must be configured for relatively high power levels. In particular, the high levels of hydraulic loss associated with this device are particularly acute in large rotational speed ranges, thus causing high losses in the part-load range of the system and high start-up costs.

These drawbacks are largely avoided by the gear known from WO 2004/109157 A. In this case, a hydraulic system is used which keeps the power directed via the hydraulic system at a relatively low level in the part-load range by means of a multi-path equalising gear. However, the complicated multi-path equalising gear, in conjunction with a complex coupling system and pumps which can only be adjusted with considerable effort and are both operated at variable rotational speeds, is a major drawback of this solution.

SUMMARY

The object of the invention is to minimise the aforementioned drawbacks of the known equalising gears and to provide a simple, efficient and cost-effective proposal.

This object is achieved with a generic gear by connecting the input shaft of the continuously controllable gearing to the output shaft of the gear unit via an adjustable ratio gear.

This object is further achieved by a method for switching the power range of an equalising gear of a wind energy system when the wind strength changes comprising a gear unit having three in- or outputs, an input being connected to the rotor of the wind energy system, the first output being connected to a generator and the second output being connected to the input shaft of a continuously controllable gearing, the output shaft of which is connected to the generator-side output of the gear unit, characterised in that the input of the gear unit is regulated to a small to zero input torque and the generator is detached from the grid, a switchable gearing which connects the input shaft of the continuously controllable gearing to the output shaft of the gear unit is switched and the rotational speed of the first output of the gear unit is subsequently adjusted until the synchronous rotational speed is reestablished at the generator, whereupon the generator is reattached to the grid.

Finally, this object is also achieved by a method for changing the power range of an equalising gear of a wind energy system when the wind strength changes comprising a gear unit having three in- or outputs, an input being connected to the rotor of the wind energy system, the first output being connected to a generator and the second output being connected to the input shaft of a continuously controllable gearing, the output shaft of which is connected to the generator-side output of the gear unit, characterised in that the transmission ratio of a stageless gearing which connects the input shaft of the continuously controllable gearing to the output shaft of the gear unit is adjusted.

The adjustable ratio gear, which may be a gearing with stages or a stageless gearing, enables the range of the rotational speed to be changed as a function of the required torque by changing the transmission ratio in said adjustable ratio gear, thereby enabling the power range of the continuously controllable gearing, and therefore the system costs and the power loss of said gear, to be kept to a minimum.

The sub-claims relate to preferred embodiments of the invention.

BRIEF DESCRIPTION OF THE DRAWING

FIG. 1 is a schematic illustration of an embodiment of the invention.

A preferred embodiment of the invention will be described in greater detail below with reference to the appended drawing.

DETAILED DESCRIPTION

The simplified schematic drawing shows a transmission 1 comprising an equalising gear according to the invention. The transmission comprises an input shaft 2 which is connected to the rotor 3, optionally by an intermediate gear, and, in the present case, drives two gear stages which are arranged in succession and are formed as planetary stages 4 and 5. It is not necessary to form the gear stages as planetary stages and they may be formed as other types of gears or be dispensed with entirely.

The output shaft of the second gear stage 5 drives a spur gearing stage 6, thus enabling the transmission to be shifted axially. This shift firstly enables a cable which extends to the hub and controls the power of the system by means of a blade adjustment mechanism to be guided through the gear, and secondly enables the required devices (slip ring members) for transferring signals from the rotating part to the fixed part to be accommodated in the pod of the wind energy system, thereby also enabling the transmission to be as short and compact as possible over the entire length thereof.

The output shaft 6a of the spur gearing stage drives a planet carrier 8 of a superposition gear unit 7. The torque is distributed to a generator 11 and a hydraulic unit 12 within the superposition gear unit 7. For this purpose, the generator 11 is connected to the ring gear 9 of the superposition gear unit 7. The sun gear 10 of the superposition gear unit 7 is connected to a two-stage adjustable ratio gear 15. The gear stage of the adjustable ratio gear 15 is selected as a function of the rotational speed of the rotor and the wind supply. Disposed on the output of the two-stage gearing 15 is a shaft 20 of a first adjustable axial piston pump 13 which is hydraulically connected to a second adjustable axial piston pump 14. The shaft 22 of the second axial piston pump 14 is coupled to the shaft 11 of the generator by a spur gearing stage 16.

In the lower power and rotational speed range of the wind energy system, the synchronous rotational speed required is established at the generator 11 by adjusting the axial piston pumps 13, 14. Power in the superposition gear unit 7 flows from the driving spur gearing stage 6 to the planetary gearing 8, then to the ring gear 9 and the generator 11. The second axial piston pump 14, which generates the pressure required for the hydraulic circuit, is driven by the spur gearing stage 16 on the generator shaft. The energy in the hydraulic circuit is converted once again into rotational energy by the first axial piston pump 13 and drives the sun gear 10 of the superposition gear unit 7. In this way, the transmission ratio is continuously varied and adjusted to the particular power level, the rotational speed of the input shaft of the generator 11 remaining constant.

As the wind supply increases, the power of the system and therefore the rotational speed at the hydraulic unit 12 also increases. Before the threshold speed at the hydraulic unit 12 is reached, the system is regulated by the electrical blade adjustment system to a small to zero input torque. During this switching phase, the synchronous generator 11 is detached from the grid. The gear 15 is switched to the lower transmission ratio in this low power phase. The rotational speed of the rotor is then increased once again by the blade adjustment system until the synchronous rotational speed at the generator 11 is reached. After this synchronisation procedure is complete and the generator has been reattached to the grid, the system transitions again into its normal operating mode, but functions at higher power. The hydraulic units 12 thus enable considerably higher levels of system power to be controlled, with the same power loss.

In nominal operation and in the permitted range above rated power, the power flow revolves via the superposition gear unit 7. The excess power is transmitted by the sun gear 10 of the superposition gear unit 7 via the gear 15 to the hydraulic unit 12. Since said hydraulic unit is connected via the spur gearing 16, it exerts a braking torque on the generator shaft, thus holding the rotational speed of the generator constant at the synchronous rotational speed. This torque is applied until the blade adjustment device has rotated the rotor blades out of the wind to such an extent that the rated power is once again attained.

The invention claimed is:

1. A method for changing the power range of an equalising gear of a wind energy system, the equalising gear comprising a gear unit having an input, an output, and an input/output, wherein the input is connected to a rotor of the wind energy system, the output is connected to a generator and the input/output is connected to a first shaft of a continuously variable gearing, a second shaft of which is connected to the output of the gear unit, the method comprising following steps:

regulating, upon changing wind strength, the input of the gear unit to a small to zero input torque;

detaching the generator from a grid;

switching of a switchable gearing, which connects the first shaft of the continuously variable gearing to the input/output of the gear unit;

adjusting a rotational speed of the output of the gear unit until a synchronous speed is reestablished at the generator; and attaching the generator to the grid.

2. The method of claim 1, wherein at least one of the step of regulating the input and the step of adjusting the rotational speed is performed by means of a blade adjustment device of the wind energy system.

3. The method of claim 1, wherein the step of regulating the input is performed before, given the changing wind strength, a threshold speed of the continuously variable gearing is reached.

\* \* \* \* \*